(12) United States Patent
Morrison et al.

(10) Patent No.: US 10,296,049 B2
(45) Date of Patent: May 21, 2019

(54) CARBON FIBER/CERAMIC CHASSIS

(71) Applicant: Dell Products L.P., Round Rock, TX (US)

(72) Inventors: Jason S. Morrison, Cedar Park, TX (US); Kevin L. Kamphuis, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 209 days.

(21) Appl. No.: 14/800,167

(22) Filed: Jul. 15, 2015

(65) Prior Publication Data

US 2017/0017272 A1 Jan. 19, 2017

(51) Int. Cl.
*B32B 5/02* (2006.01)
*B32B 7/12* (2006.01)
(Continued)

(52) U.S. Cl.
CPC ............ *G06F 1/1656* (2013.01); *B29C 70/86* (2013.01); *B32B 5/02* (2013.01); *B32B 7/12* (2013.01); *B32B 9/005* (2013.01); *B32B 9/045* (2013.01); *B32B 9/047* (2013.01); *B32B 18/00* (2013.01); *B32B 27/365* (2013.01); *B32B 27/38* (2013.01); *B32B 27/42* (2013.01); *B32B 37/18* (2013.01); *C04B 37/008* (2013.01); *G06F 1/1637* (2013.01); *B29K 2709/02* (2013.01); *B32B 37/12* (2013.01); *B32B 2262/0269* (2013.01); *B32B 2262/106* (2013.01); *B32B 2264/102* (2013.01); *B32B 2264/104* (2013.01); *B32B 2307/732* (2013.01); *B32B 2309/105* (2013.01); *B32B 2313/04* (2013.01);
(Continued)

(58) Field of Classification Search
None
See application file for complete search history.

(56) References Cited

U.S. PATENT DOCUMENTS 9,011,997 B2 * 4/2015 Weber .................. B32B 37/144
428/336
2003/0019843 A1 * 1/2003 Kawai .................. C04B 35/111
216/108
(Continued)

FOREIGN PATENT DOCUMENTS

| JP | 2015089656 A | * | 5/2015 |
| JP | 2015089656 A | * | 5/2015 |
| JP | 201589656 A | * | 11/2015 |

*Primary Examiner* — William C Vaughn, Jr.
*Assistant Examiner* — Lindsay J Uhl
(74) *Attorney, Agent, or Firm* — Haynes and Boone, LLP

(57) ABSTRACT

A chassis defines a system housing that houses a processing system and a display system. A chassis wall provided on the chassis includes a first carbon fiber layer that provides an outer surface of the chassis that is located opposite the chassis wall from the housing and a ceramic layer that is bonded to the first carbon fiber layer and located opposite the first carbon fiber layer from the outer surface. The ceramic layer provides additional stiffness to the chassis wall to resist deflection of the chassis wall into at least one of the display system and the processing system in response to a force. The chassis wall may include a second carbon fiber layer that is bonded to the ceramic layer and located opposite the ceramic layer from the first carbon fiber layer to provide an inner surface of the chassis wall.

14 Claims, 17 Drawing Sheets

(51) Int. Cl.
*B32B 9/00* (2006.01)
*B32B 9/04* (2006.01)
*G06F 1/16* (2006.01)
*B29C 70/86* (2006.01)
*B32B 18/00* (2006.01)
*B32B 27/36* (2006.01)
*B32B 27/38* (2006.01)
*B32B 27/42* (2006.01)
*B32B 37/12* (2006.01)
*B32B 37/18* (2006.01)
*C04B 37/00* (2006.01)
*B29K 709/02* (2006.01)

(52) U.S. Cl.
CPC ....... *B32B 2315/02* (2013.01); *B32B 2457/20* (2013.01); *B32B 2457/208* (2013.01); *C04B 2235/5248* (2013.01); *C04B 2235/96* (2013.01); *C04B 2237/343* (2013.01); *C04B 2237/36* (2013.01); *C04B 2237/365* (2013.01); *C04B 2237/368* (2013.01); *C04B 2237/38* (2013.01); *C04B 2237/704* (2013.01)

(56) References Cited

U.S. PATENT DOCUMENTS

| | | | |
|---|---|---|---|
| 2009/0117366 A1* | 5/2009 | Honma | B29C 70/086 428/314.8 |
| 2012/0050975 A1* | 3/2012 | Garelli | G06F 1/1615 361/679.27 |
| 2013/0188366 A1* | 7/2013 | Russell-Clarke | C03B 23/245 362/362 |
| 2014/0126135 A1 | 5/2014 | Abbatiello et al. | |
| 2015/0300961 A1* | 10/2015 | Shah | G01N 21/8803 356/35.5 |
| 2016/0259366 A1* | 9/2016 | Kenney | G06F 1/1601 |

* cited by examiner

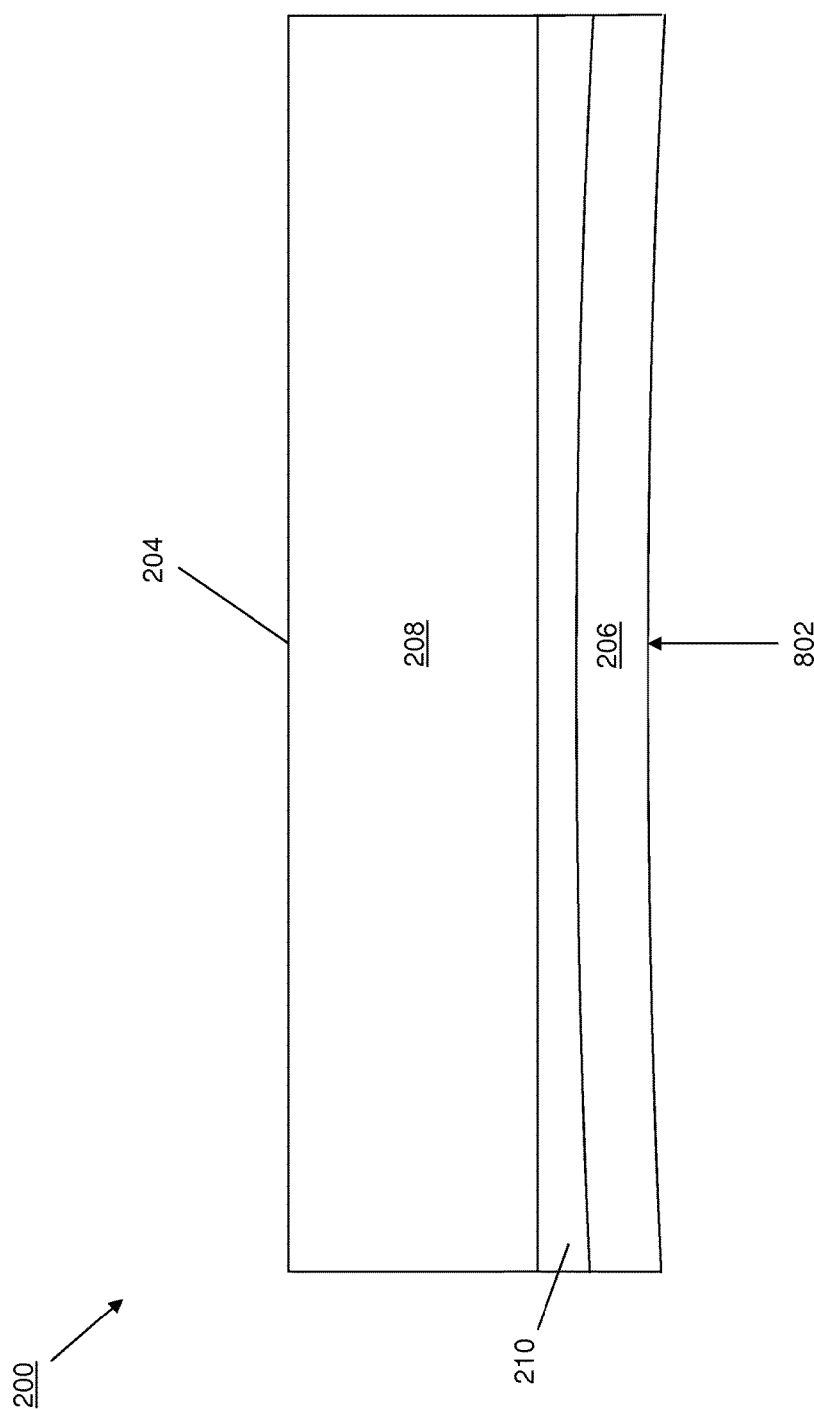

US 10,296,049 B2

CARBON FIBER/CERAMIC CHASSIS

BACKGROUND

The present disclosure relates generally to information handling systems, and more particularly to a carbon fiber/ceramic chassis for information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems components have become smaller (and yet more powerful), a push towards thinner and lighter weight chassis has emerged to reduce the thickness and weight of mobile devices such as tablet computers, laptop/notebook computers, mobile phones, and/or other mobile devices known in the art. For example, laptop/notebook computer manufacturers routinely compete to produce the "thinnest" and "lightest" laptop/notebook computer on the market. One of a variety of materials that are used to provide the chassis used in such mobile devices is carbon fiber. However, while the use of carbon fiber can provide a considering relatively strong and thin chassis, structural integrity issues associated with carbon fiber result in a thicker chassis than is desired. For example, while carbon fiber may be used to provide a thin, high strength layer in a chassis wall of a chassis, that carbon fiber layer will exhibit a relatively low stiffness such that high forces and/or flexure stresses (e.g., due to the handling of the chassis by a user) can cause deflection of chassis wall that can engage and sometimes damage components that are housed in the chassis. Conventional solutions to such issues provide layers of aluminum, magnesium, and/or plastics to provide sufficient stiffness to the chassis wall in order to prevent such deflection, but the addition of those layer(s) increases the thickness of the chassis wall and, as a result, the chassis.

Accordingly, it would be desirable to provide an improved chassis.

SUMMARY

According to one embodiment, a system chassis includes a chassis wall including an inner surface and an outer surface; a first carbon fiber layer that is included in the chassis wall and that provides the outer surface of the chassis wall; and a ceramic layer that is located opposite the first carbon fiber layer from the outer surface, wherein the ceramic layer provides additional stiffness to the chassis wall to resist deflection of the chassis wall that is more than a predetermined maximum amount in response to a predetermined force; and a resin material that is included in the chassis wall and that bonds the first carbon layer to the ceramic layer.

BRIEF DESCRIPTION OF THE DRAWINGS

FIG. 2b is a rear perspective view illustrating an embodiment of the information handling system chassis of FIG. 2a.

FIG. 3b is a cross-sectional view illustrating an embodiment of the information handling system chassis of FIG. 3a.

FIG. 4a is a cross-sectional view illustrating an embodiment of a chassis wall of the information handling system chassis of FIGS. 2a and 3a.

FIG. 4b is a cross-sectional view illustrating an embodiment of the chassis wall of the information handling system chassis of FIGS. 2a and 3a.

FIG. 4c is a cross-sectional view illustrating an embodiment of the chassis wall of the information handling system chassis of FIGS. 2a and 3a.

FIG. 9 is a cross-sectional view illustrating an embodiment of a chassis wall in the information handling system chassis of FIGS. 2a, 2b, and 2c experiencing a force.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
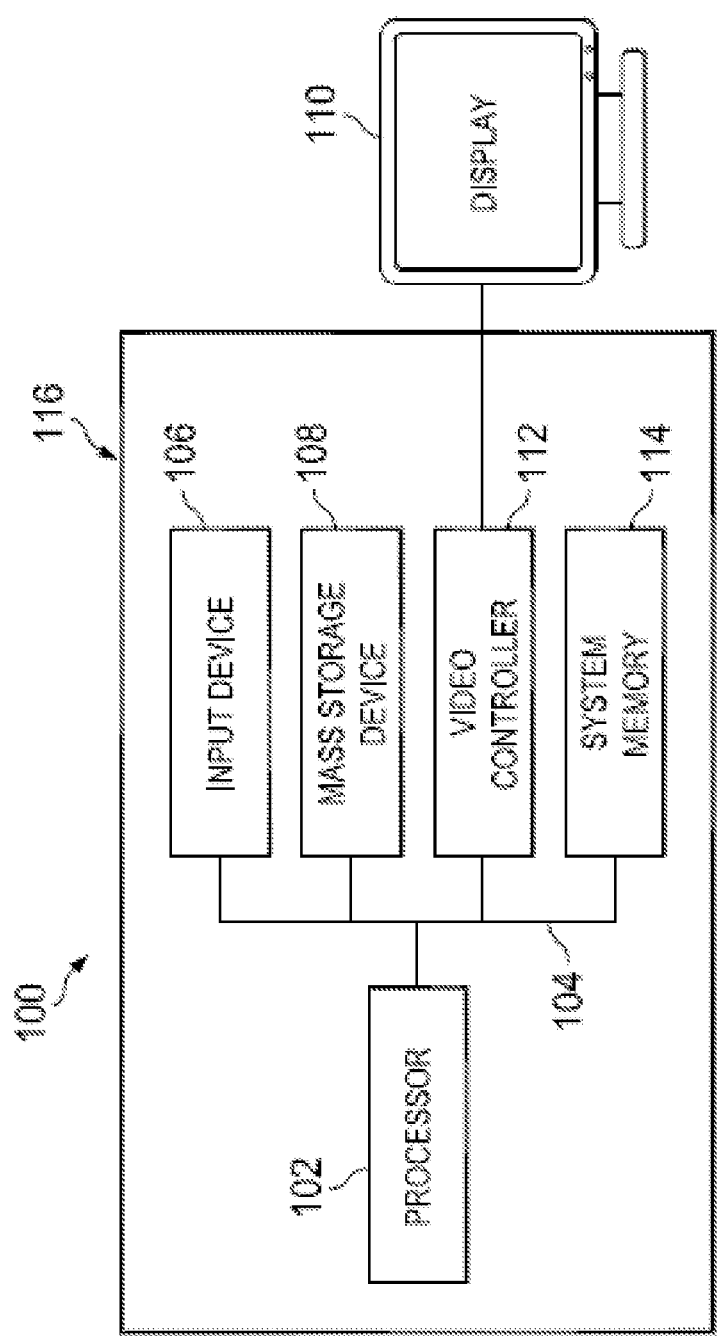
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
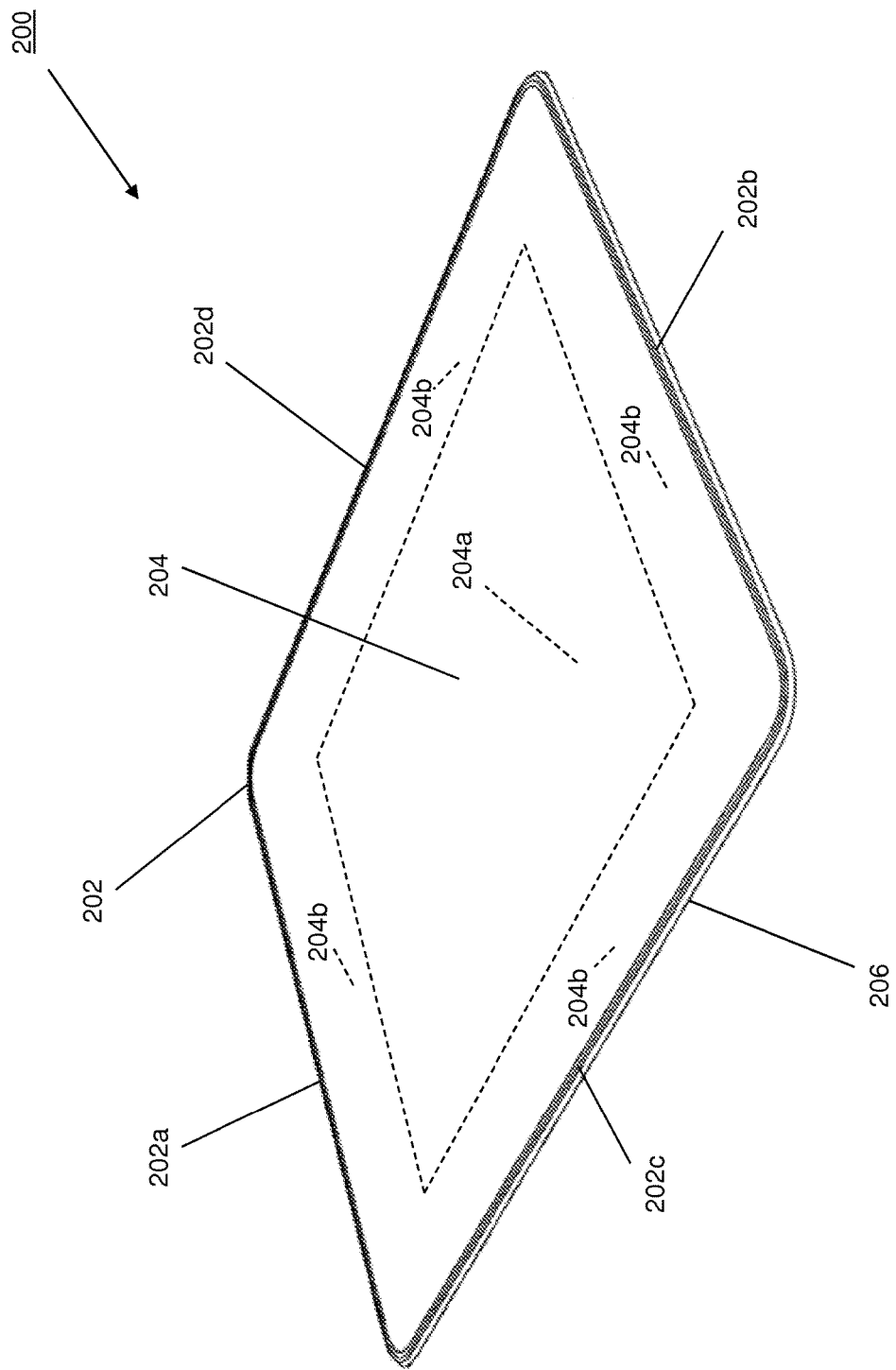
FIG. 2a is a front perspective view illustrating an embodiment of an information handling system chassis.
Figure 2B:
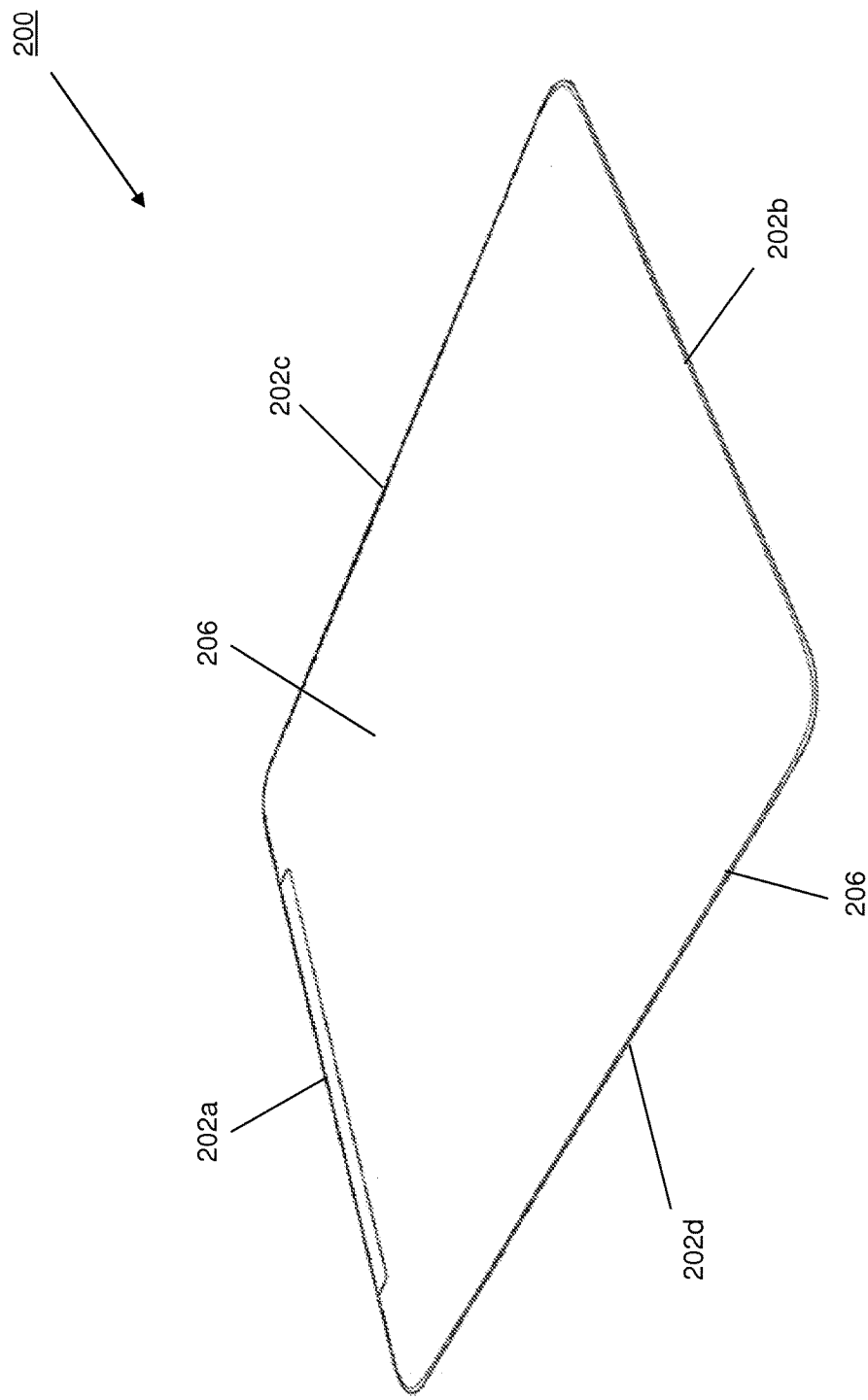

Referring now to FIGS. 2a and 2b, an embodiment of a tablet computer 200 is illustrated. In an embodiment, the tablet computer 200 may be the IHS 100, discussed above with reference to FIG. 1, and/or may include some or all of the components of the IHS 100. As discussed below, the tablet computer 200 may experience high forces and particularly, flexure stresses and deflections, due to the handling of the tablet computer 200 by a user. However, the teachings of the present disclosure may be applied to a variety of other types of IHSs known in the art, each of which may each experience particular forces and stresses that are different than those experienced by the tablet computer 200 discussed below while remaining within the scope of the present disclosure. The tablet computer 200 includes a chassis base 202 having a top edge 202a, a bottom edge 202b located opposite the chassis base 202 from the top edge 202a, and a plurality of side edges 202c and 202d extending between the top edge 202a and the bottom edge 202b and on opposite sides of the chassis base 202. The chassis base 202 provides a front surface 204 of the tablet computer 200 that includes a center portion 204a (bounded by the dashed line in FIG. 2b) and an edge section 204b that extends around the circumference of the chassis base 202 from the center portion 204 and to each of the top edge 202a, the bottom edge 202b, and the side edges 202c and 202d. In an embodiment, the center portion 204a may be provided by a display device of the IHS 200, and the edge section 204b may be utilized in handling the tablet computer 200. A rear chassis wall 206 is provided on the IHS 200 opposite the front surface 204 and extending between the top edge 202a, the bottom edge 202b, and the side edges 202c and 202d.

Figure 2C:
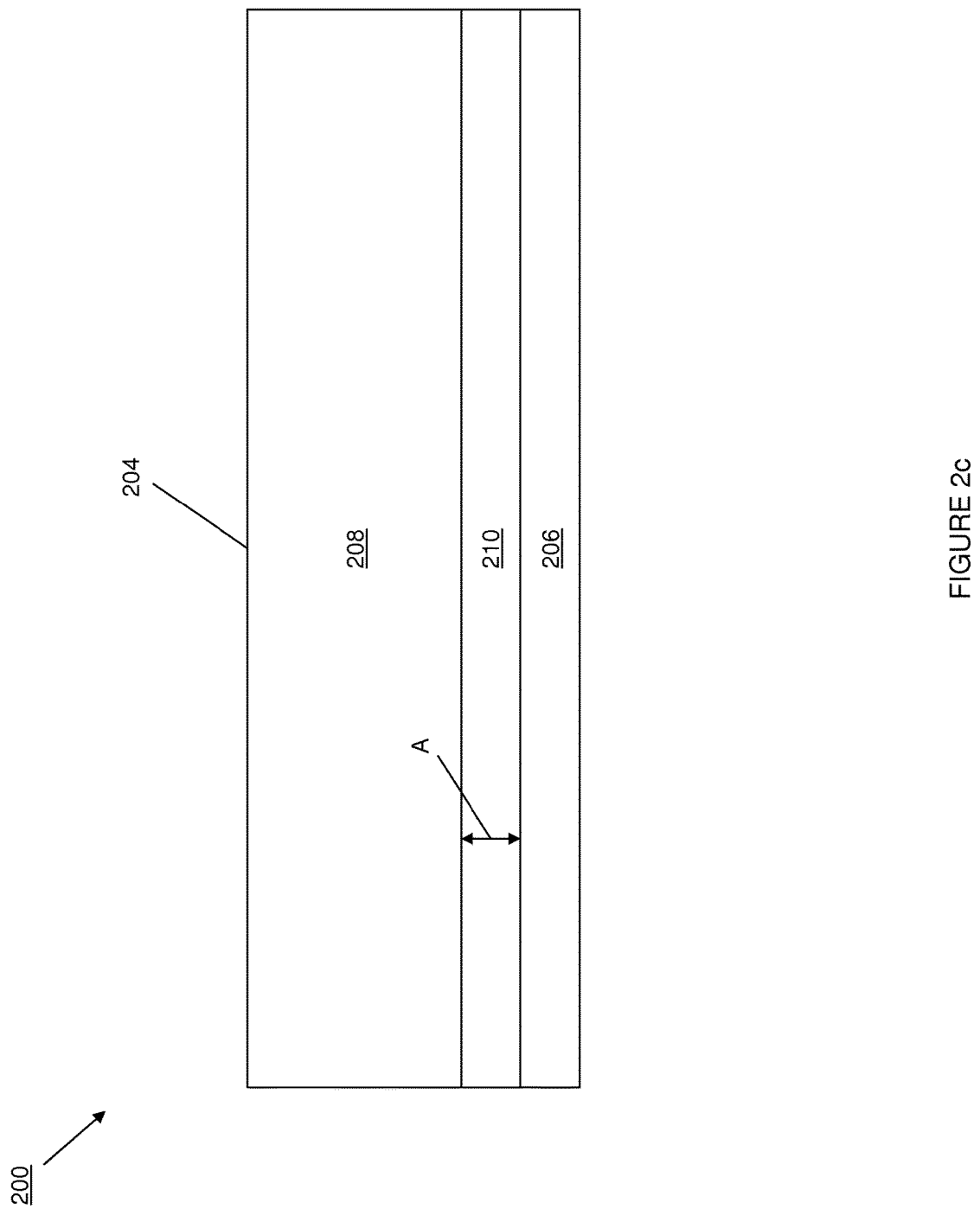
FIG. 2c is a cross-sectional view illustrating an embodiment of the information handling system chassis of FIGS. 2a and 2b.

Referring now to FIG. 2c, the chassis base 202 defines an IHS housing between the chassis wall 206 and the front surface 204, and that houses a display device 208 that provides the front surface 204 of the tablet computer 200. A housing portion 210 is located between the chassis wall 206 and the display device 208 and may house any of the components of the tablet computer 200. The housing portion 210 provides a separation A between the chassis wall 206 and the display device 208 that is discussed below as providing a gap between the chassis wall 206 and the display device 208 that may be bridged due to deflection of conventional chassis walls. However, one of skill in the art in possession of the present disclosure will recognize that the housing portion 210 may provide the separation A between the chassis wall 206 and other components of the tablet computer 200 while remaining within the scope of the present disclosure.

Figure 3A:
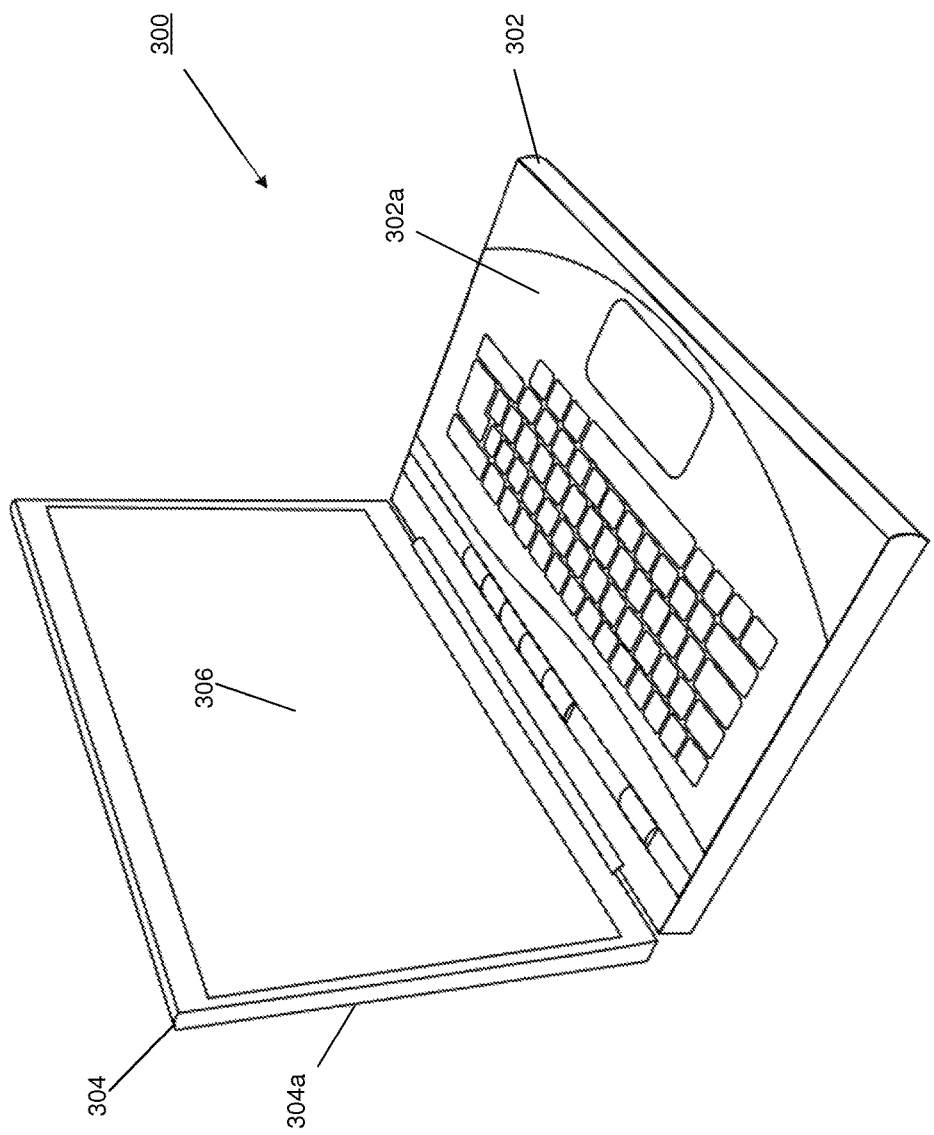
FIG. 3a is a perspective view illustrating an embodiment of an information handling system chassis.
Figure 3B:
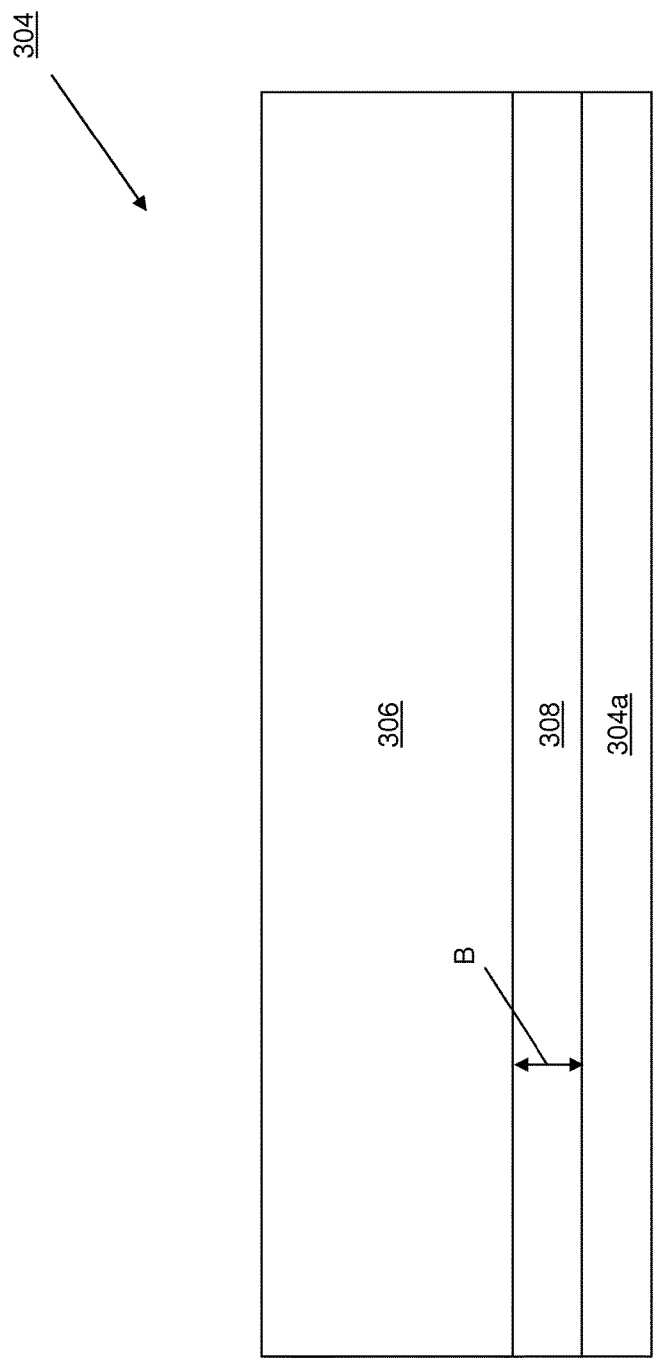

Referring now to FIGS. 3a and 3b, an embodiment of a laptop/notebook computer 300 is illustrated. In an embodiment, the laptop/notebook computer 300 may be the IHS 100, discussed above with reference to FIG. 1, and/or may include some or all of the components of the IHS 100. As discussed below, the laptop/notebook computer 300 may experience high forces and particularly, flexure stresses and deflection, due to the handling of the laptop/notebook computer 300 by a user. However, the teachings of the present disclosure may be applied to a variety of other types of IHSs known in the art, each of which may each experience particular forces and stresses that are different than those experienced by the notebook type IHS discussed below while remaining within the scope of the present disclosure. The laptop/notebook computer 300 includes a chassis base 302 that is moveably coupled to a display base 304. The chassis base 302 provides a case or a shell of the laptop/notebook computer 300 that houses and/or protects some or all of the components of the laptop/notebook computer 300 via, for example, chassis walls 302a (illustrated as the chassis wall that provides a "palm rest" in FIG. 3a, but which also may be the bottom of the chassis base 302 opposite the palm rest as well). The display base 304 provides a case or a shell of the laptop/notebook computer 300 that houses and/or protects a display 306 the laptop/notebook computer 300 via, for example, chassis walls 304a (illustrated as the chassis wall that provides a rear wall of the display base 304 in FIG. 3a).

Referring now to FIG. 3b, the display base 304 defines a display housing between the chassis wall 304a and the display 306 that houses the display 306. A housing portion 308 is located between the chassis wall 304a and the display 306 and may house any of the components of the display 306. The housing portion 308 provides a separation B between the chassis wall 304a and the display 306 that is discussed below as providing a gap between the chassis wall 304a and the display 306 that may be bridged due to deflection of conventional chassis walls. However, one of skill in the art in possession of the present disclosure will recognize that the housing portion 308 may provide the separation B between the chassis wall 302a and other components of the laptop/notebook computer 300 laptop/notebook computer that are housed in the chassis base 302 while remaining within the scope of the present disclosure.

Figure 4A:
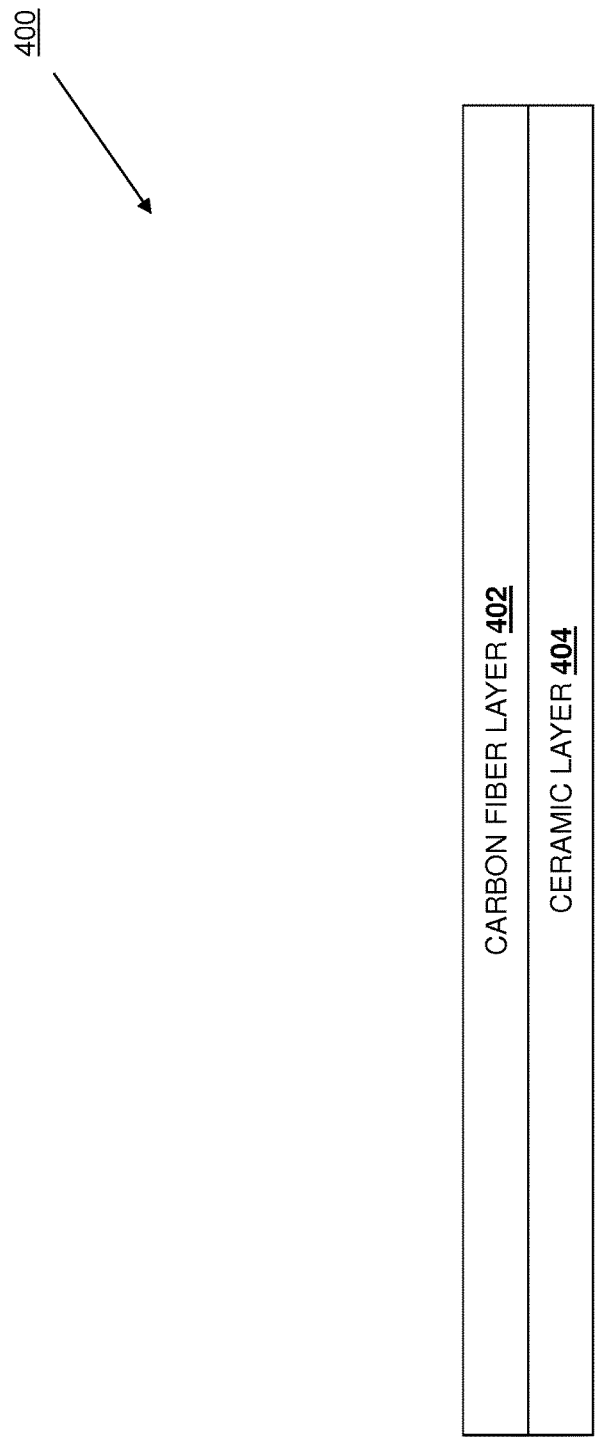
Figure 4B:
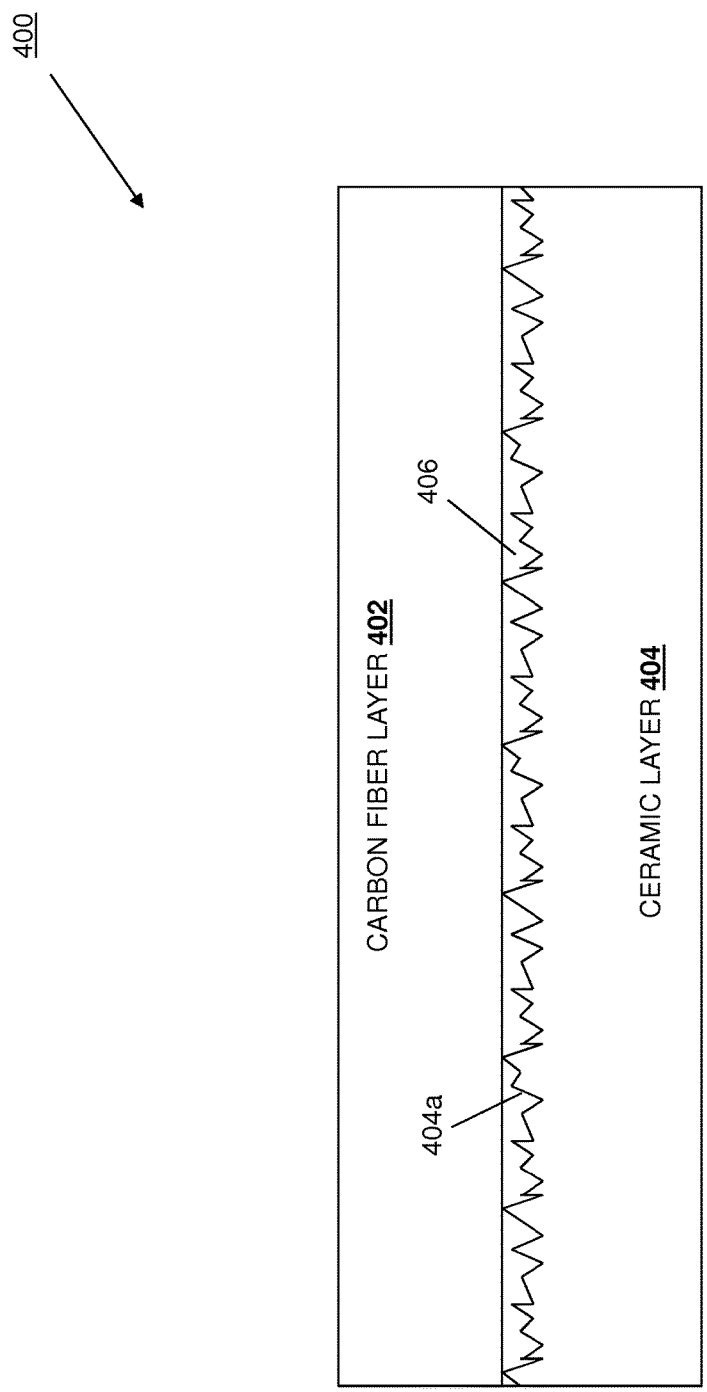
Figure 4C:
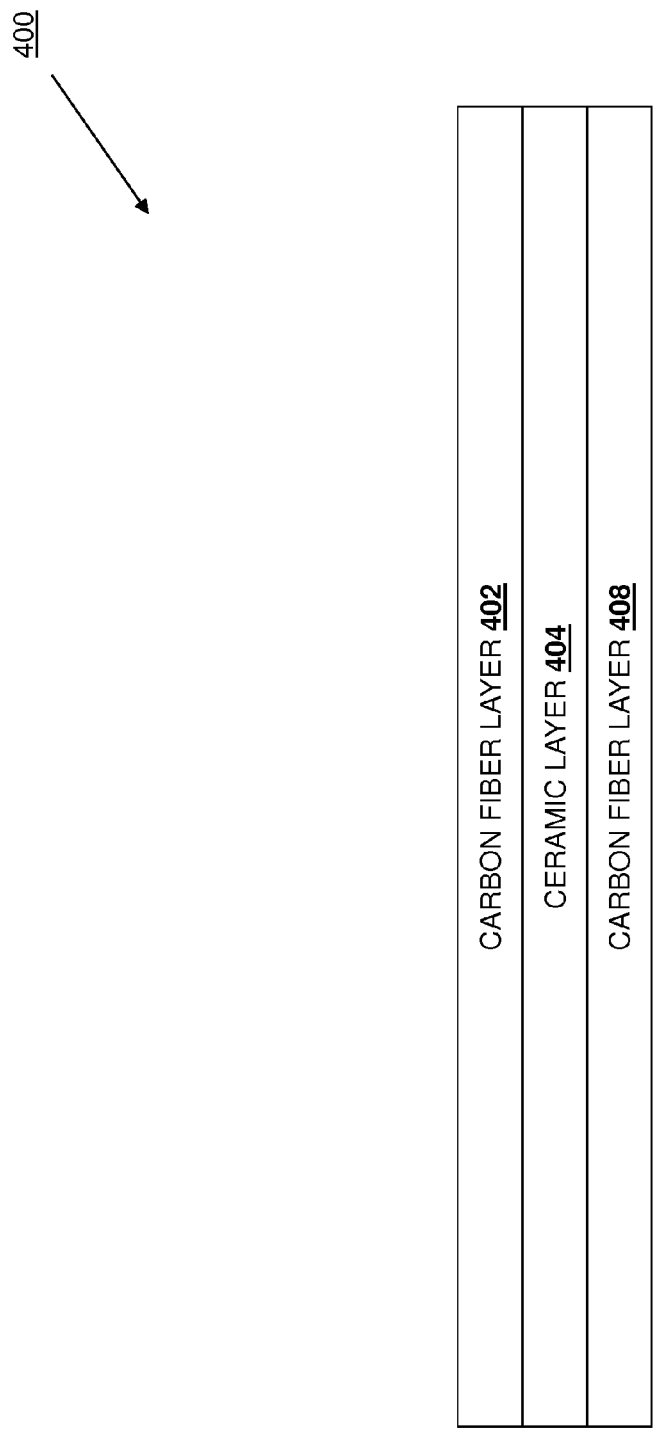

Referring now to FIGS. 4a, 4b, and 4c, embodiments of a chassis wall 400 are illustrated. In different embodiments, the chassis wall 400 may be the chassis wall 206 illustrated in FIGS. 2a-2c, the chassis walls 304a and/or 302a illustrated in FIGS. 3a and 3b, and/or any of the other chassis walls described herein. In the illustrated embodiment of FIG. 4a, the chassis wall 400 includes a carbon fiber layer 402 that may include one or more carbon fiber and/or carbon fiber composite materials known in the art, and a ceramic layer 404 that may include one or more ceramic materials known in the art and that may be bonded to the carbon fiber layer 402 using a resin material. In specific embodiments, the carbon fiber layer 402 of the chassis wall 400 may be a standard modulus carbon fiber layer that includes a Young's modulus of approximately 40 gigapascals (GPa), a high modulus carbon fiber layer that includes a Young's modulus of approximately 70 GPa. While the materials illustrated in FIG. 6 indicate carbon fibers with Young's modulus of over 200 GPa, one of skill in the art will recognize that when combined with a matrix to provide the carbon fiber layer, the Young's modulus of the resulting structure that includes the carbon fibers may drop to the levels discussed above.

In specific embodiments, the ceramic layer 404 of the chassis wall 400 may include, for example, alumina ($Al_2O_3$), silicon carbide (SiC), silicon nitride (SiN), lead titanate ($PbTiO_3$), boron carbide ($B_4C$), zirconia ($ZrO_2$), zirconia toughened alumina, and/or a variety of other ceramic materials known in the art. In a specific embodiment, the ceramic layer 404 may be bonded to the carbon fiber layer 402 using a resin material such as, for example, a thermoset plastic resin material (e.g., an epoxy resin material, phenolic resin material, etc.), a thermoplastic resin material (e.g., a polycarbonate resin material, polycarbonate-ABS blended resin material, etc.), and/or other resin materials known in the art. However, in other embodiments, a variety of different materials may be utilized to provide the bonding between the carbon fiber layer(s) and ceramic layer(s) discussed below while remaining within the scope of the present disclosure.

Referring now to FIG. 4b, an embodiment of the chassis wall 400 is illustrated that includes details of the bonded interface between the carbon fiber layer 402 and the ceramic layer 404. While the contact interface between the carbon fiber layer 402 and the ceramic layer 404 in FIG. 4a is illustrated as a relative flat, smooth surface, in some embodiments, the surface of the ceramic layer 404 may be left in an as-sintered condition to reduce costs of fabricating the chassis wall 400 while also enhancing the bonding strength between the carbon fiber layer 402 and the ceramic layer 404. As illustrated in FIG. 4b, the ceramic layer 404 includes an as-sintered surface 404a that may result from the sintering process that follows forming the ceramic layer 404, and that provides a relatively rough surface as illustrated. As is known in the art, sintered ceramic materials are typically polished to smooth out the surfaces that result from the sintering process. However, the as-sintered surface 404a of the ceramic layer 404 has been found to provide sufficient surface roughness that provide a desirable bonding strength to the carbon fiber layer 402 using the resin material 406 (and or other bonding materials discussed below), as illustrated in FIG. 4b.

Referring now to FIG. 4c, an embodiment of the chassis wall 400 is illustrated that further includes a carbon fiber layer 408 that is bonded to the ceramic layer 404 on an opposite side of the ceramic layer 404 from the carbon fiber layer 402. In some embodiments, the carbon fiber layer 408 may be substantially similar to the carbon fiber layer 402 discussed above, and may be bonded to the ceramic layer 404 in substantially the same manners as discussed above for the carbon fiber layer 402. However, in some embodiments, the carbon fiber layer 408 may differ from the carbon fiber layer 402 in one or more features or aspects. For example, the carbon fiber layer 402 may be a relatively high-strength, low modulus carbon fiber layer that has been processed to provide aesthetic features, while the carbon fiber layer 408 may be a relatively low-strength, high modulus carbon fiber layer that has been not been processed to provide aesthetic features. As discussed below, the carbon fiber layer 402 may be used to provide an outer surface of the chassis wall 400, and as such the carbon fiber layer 402 may be processed (e.g., to provide desired characteristics) in a manner that is not necessary for the carbon fiber layer 408 when that carbon fiber layer 408 provides an inner surface of the chassis wall 300.

In some embodiments, the thickness of the ceramic layer 404 (e.g., as measured between its surface that is bonded to the carbon fiber layer 402 and its surface that is located opposite the ceramic layer 404 from the carbon fiber layer 402) ranges from about 0.15 millimeters to 0.30 millimeters. However, in other embodiments, the thickness of the ceramic layer 404 may range between 0.1 mm and up to 3 millimeters. As discussed below, thicknesses of the ceramic layer 404 of at least 0.15 millimeters have been found to provide additional stiffness to a chassis wall including carbon fiber layer(s) (e.g., 402 and 408) that prevents deflections of the chassis wall 400 resulting from forces experienced during normal use that will interfere with components housed in the chassis. Depending on the desired characteristics of the chassis wall 400, as well as the selected thickness of the ceramic layer 404, the thickness of each of the carbon fiber layer(s) may range between 50 micrometers to 500 micrometers.

As discussed above, the chassis wall may provide opposing outer and inner surfaces for the chassis. For example, with reference to FIGS. 2c and 3b, the surfaces of the chassis walls 206 and 304a that are located immediately adjacent the housing portions 208 and 308, respectively, may provide the inner surfaces of the tablet computer 200 and laptop/notebook computer 300, respectively, while the surfaces of the chassis walls 206 and 304a that are located opposite the chassis walls 206 and 304a from the housing portions 208 and 308 may provide the outer surfaces of the tablet computer 200 and laptop/notebook computer 300, respectively. As discussed above, the carbon fiber layer 402 that provides outer surfaces of the tablet computer 200 and laptop/notebook computer 300 may be processed (e.g., painted, polished, etc.) in a manner that provides an aesthetically pleasing surface, while the ceramic layer 404 or carbon fiber layer 408 may not be processed (as the aesthetic qualities of the ceramic layer 404 are inconsequential when providing an inner surface or intermediate layer of the chassis wall.)

Figure 5:
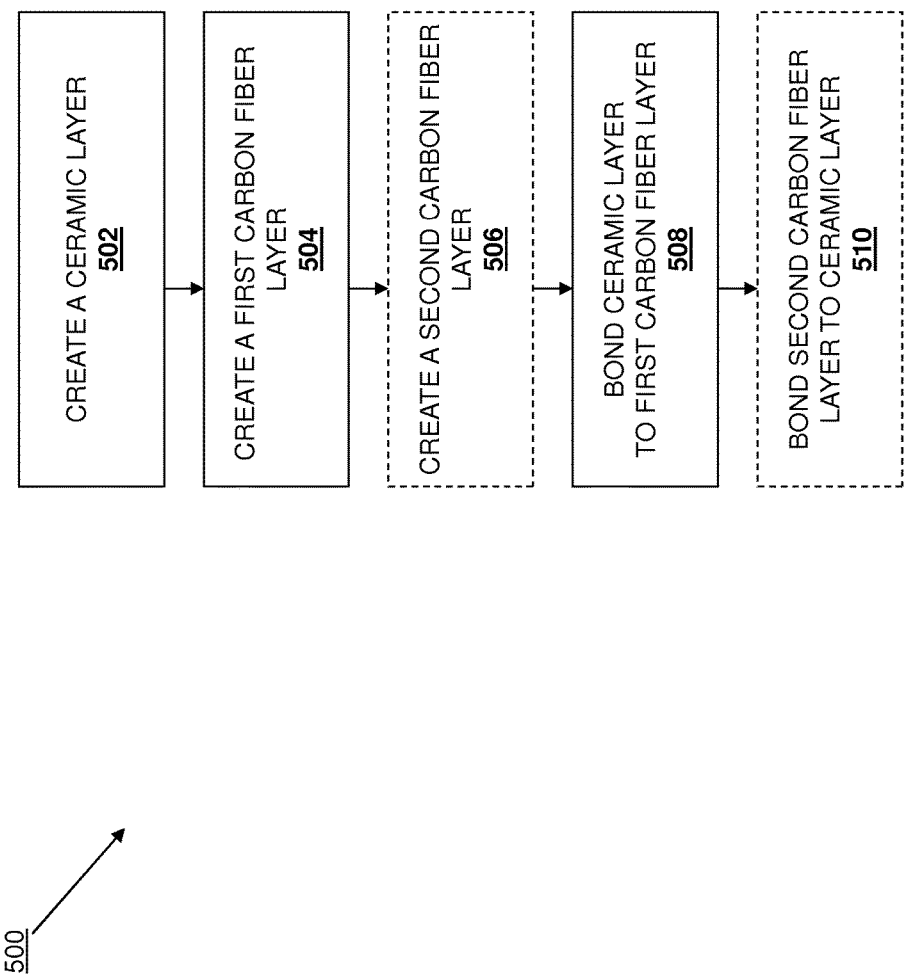
FIG. 5 is a flow chart illustrating an embodiment of a method for providing a carbon fiber/ceramic chassis.
Figure 7A:
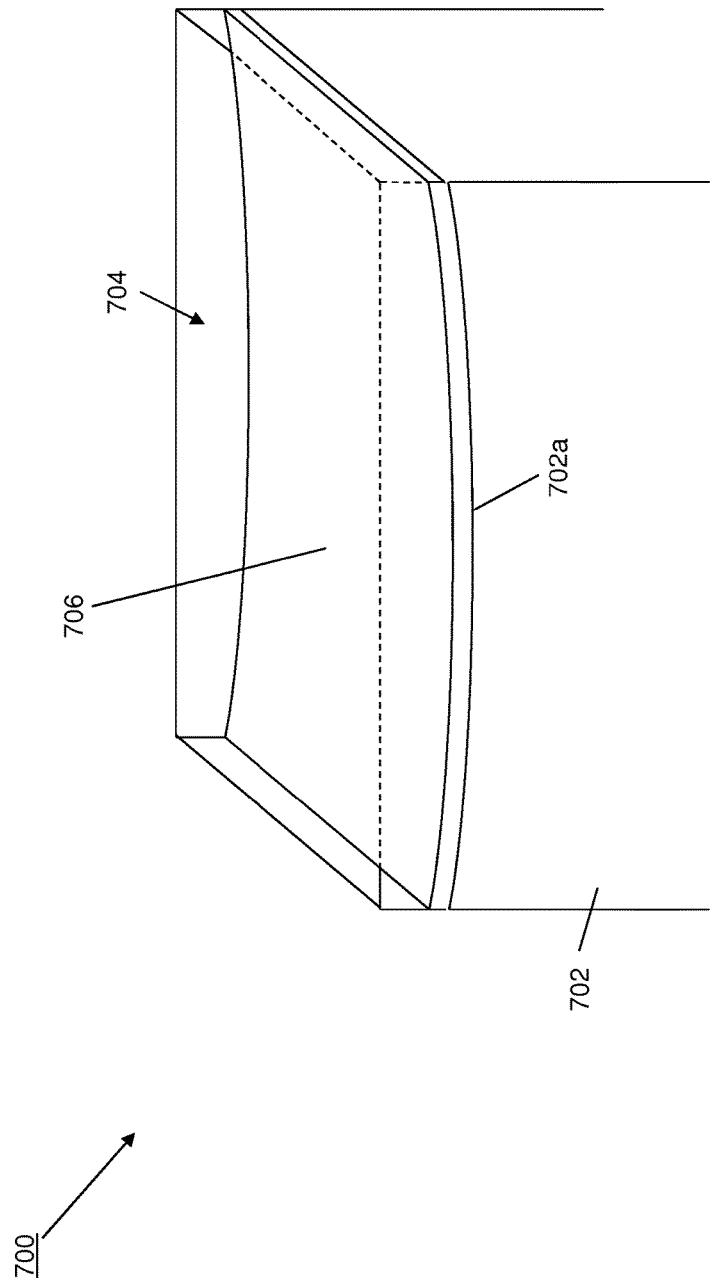
FIG. 7a is a cut-away perspective view illustrating an embodiment of a ceramic layer being fabricated in a mold.

Referring now to FIG. 5, an embodiment of a method 500 for providing a carbon fiber/ceramic chassis is illustrated. Although the method 500 is discussed below as providing particular carbon fiber/ceramic chassis walls for an IHS chassis, the method 500 may be used to provide a variety of other walls/chassis walls in an IHS chassis, as well as other structural components in other systems known in the art. The method 500 begins at block 502 where a ceramic layer is provided. Referring now to FIG. 7a, an embodiment of a mold 700 is illustrated that may be used to fabricate a ceramic layer. The mold 700 includes a base 702 having a mold surface 702a defined as part of a mold volume 704. In the illustrated embodiment, the mold surface 702a is configured in a non-planer predefined shape in order to provide a ceramic layer having the non-planar predefined shape. However, one of skill in the art in possession of the present disclosure will recognize that the mold surface 702a may include a variety of different predefined shapes in order to provide ceramic layers with such predefined shapes. Furthermore, planar mold surfaces 702a may be provided in the mold 700 to provide planar ceramic layers as well.

A ceramic layer 706 may be fabricated in the mold 700 by providing a ceramic material in the mold volume 704 and processing that ceramic material using methods such as milling, batching, forming, drying, sintering, and/or other ceramic material processing methods known in the art. In specific embodiments, the ceramic layer 706 may be fabricated using techniques such as roll compaction, tape casting, slip casting, ceramic shell casting, and dry powder pressing, and may be used in the as-sintered condition to provide a surface roughness for bonding to the carbon fiber layer 712, as discussed above and below. In some embodiments, the fabrication of the ceramic layer 706 may produce a substantially uniform ceramic layer using ceramic manufacturing techniques known in the art. While only a single ceramic layer 706 is illustrated as being provided at block 502, in some embodiments multiple ceramic layers may be provided similarly as discussed above. For example, in some embodiments, the chassis wall fabricated according to the method 500 may include a single ceramic layer (e.g., when minimizing thickness of the chassis wall is a priority), while in other examples, the chassis wall fabricated according to the method 500 may include multiple ceramic layers (e.g., when stiffness of the chassis wall is a priority). However, in experimental embodiments, it has been found that a single ceramic layer provided as discussed above will produce sufficient stiffness for most IHS chassis applications.

Figure 6:
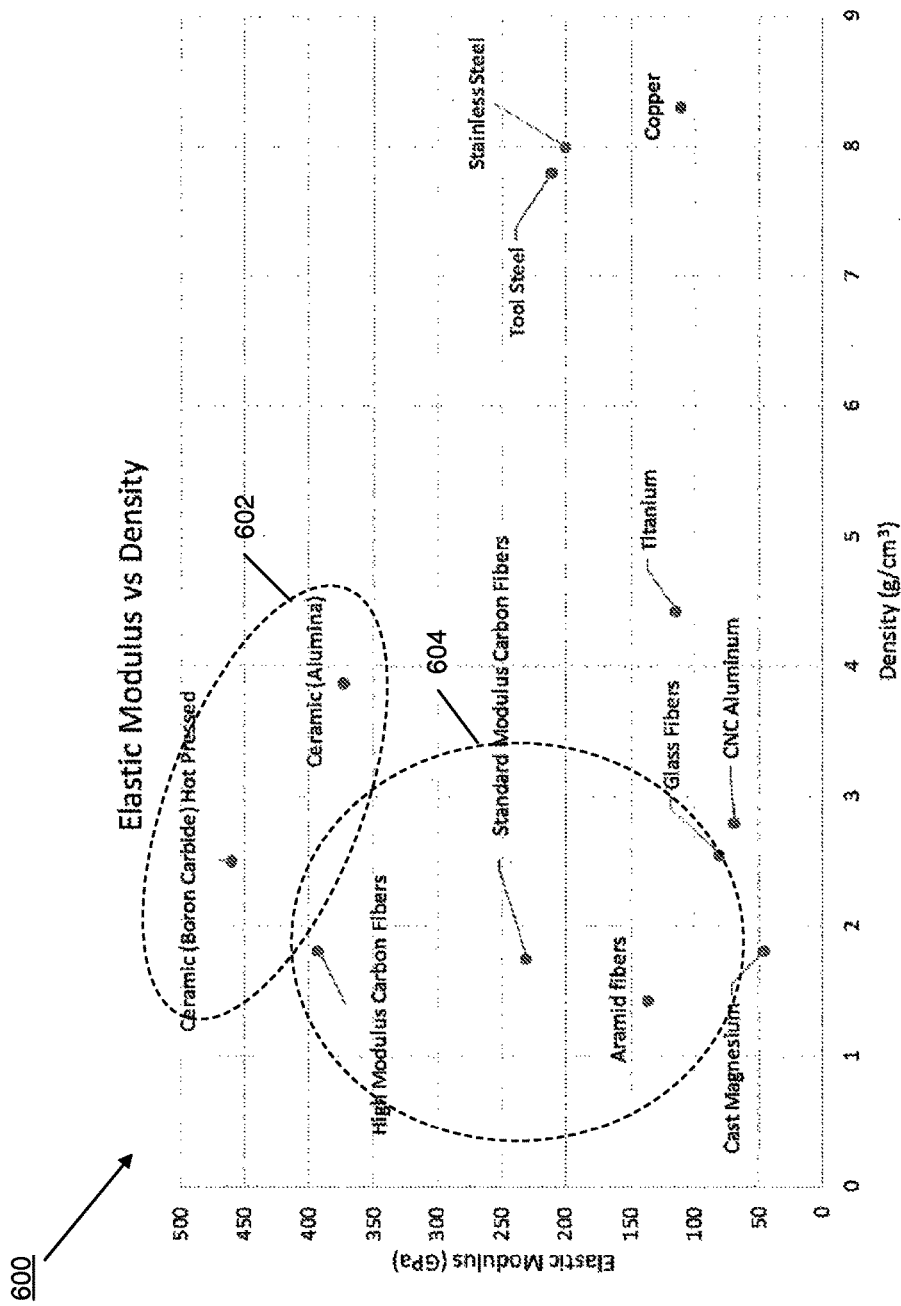
FIG. 6 is a chart illustrating physical properties of different materials that may be utilized in a carbon fiber/ceramic chassis.

Referring to FIG. 6, a chart 600 of elastic modulus versus density for some materials that may be utilized in the method 500 is illustrated. The ceramic layer 706 provided at block 502 may include high modulus ceramic materials that fall within the section 602 of the chart 600 such as the ceramic (boron carbide) hot pressed material or the ceramic (alumina) material Illustrated in FIG. 6. However, in addition to alumina ($Al_2O_3$) and/or boron carbide ($B_4C$), the ceramic layer 706 may include ceramic materials such as, silicon carbide (SiC), silicon nitride (SiN), lead titanate ($PbTiO_3$), zirconia ($ZrO_2$), and/or a variety of other ceramic materials known in the art. As discussed above, the ceramic layer 706 fabricated at block 502 may include a thickness of between 0.15 to 0.3 millimeters, although other thicknesses of the ceramic layer 706 (0.1 mm and up to 3 mm) are envisioned as falling within the scope of the present disclosure.

Figure 7B:
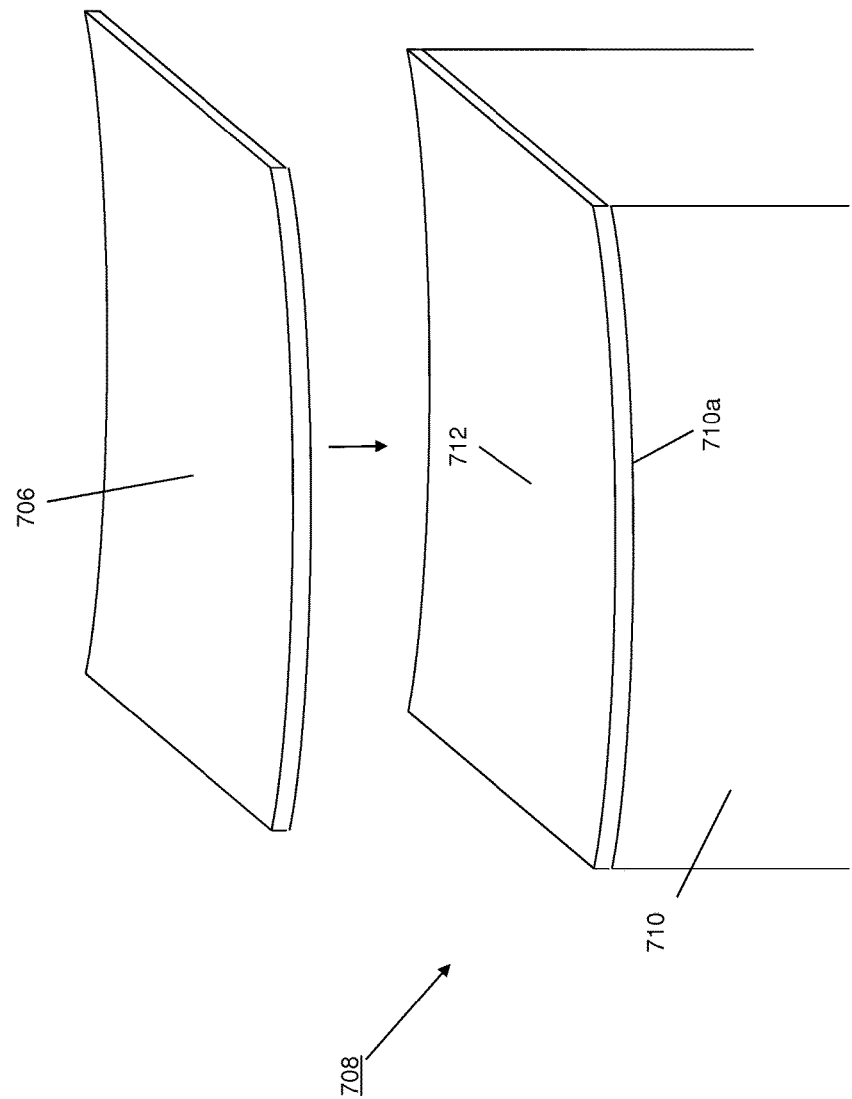
FIG. 7b is a perspective view illustrating an embodiment of the ceramic layer of FIG. 7a being bonded to a first carbon fiber layer in a mold.

The method 500 then proceeds to block 504 where a first carbon fiber layer is provided. Referring now to FIG. 7b, an embodiment of a mold 708 is illustrated that may be used to fabricate a carbon fiber layer. The mold 708 includes a base 710 having a mold surface 710a. In the illustrated embodiment, the mold surface 708a is configured in a non-planer predefined shape in order to provide a carbon fiber layer having a non-planar predefined shape that may be substantially similar to the predefined shape provided for the ceramic layer 706 by the mold 700 of FIG. 7a. However, one of skill in the art in possession of the present disclosure will recognize that the mold surface 708a may include a variety of different predefined shapes in order to provide carbon fiber layers with such predefined shapes. Furthermore, planar mold surfaces 708a may be provided in the mold 708 to provide planar carbon fiber layers as well. A carbon fiber layer 712 may be fabricated in the mold 708 by providing one or more sheets of carbon fiber material on the mold surface 710a and pre-processing that carbon fiber material using methods known in the art. Referring back to FIG. 6, the chart 600 of elastic modulus versus density for some ceramic materials that may be utilized in the method 500 illustrates how the carbon fiber layer 712 provided at block 504 may include carbon fiber materials that fall within the section 604 of the chart 600 such as high modulus carbon fibers, standard modulus carbon fibers, and aramid fibers. In a specific embodiment, the carbon fiber layer 712 may include a standard modulus carbon fiber (e.g., a relatively economical grade of carbon fiber as opposed to high modulus carbon fiber) with a Young's modulus of at least 200 gigapascals (GPa) and a density not greater than 2 gram per cubic centimeters ($g/cm^3$). In an embodiment, the carbon fiber layer 712 may be utilized and/or processed to provide desired cosmetics and impact resistance at block 504 or subsequent to its bonding to the ceramic layer 706, discussed below.

The method 500 may then proceed to optional block 506 where a second carbon fiber layer is provided. In some embodiments, the chassis wall fabricating using the method 500 may include a single carbon fiber layer (e.g., when minimizing thickness of the chassis wall is a priority), and in such embodiments optional block 506 may be skipped. However, in some embodiments, the chassis wall fabricating using the method 500 may include multiple carbon fiber layer (e.g., when strength of the chassis wall is a priority, or when surface finish of the chassis wall is a priority), and in those embodiments, optional block 506 may be performed. For example, a relatively small tablet computer that is subject to relative low stresses may utilize relatively fewer carbon fiber layers, while a 17 inch display notebook computer that is subject to relative high stresses may utilize relatively more carbon fiber layers. The provisioning of the second carbon fiber layer (and any additional carbon fiber layers) at optional block 506 may be performed in substantially the same manner as discussed above for the first carbon fiber layer at block 504.

Figure 7C:
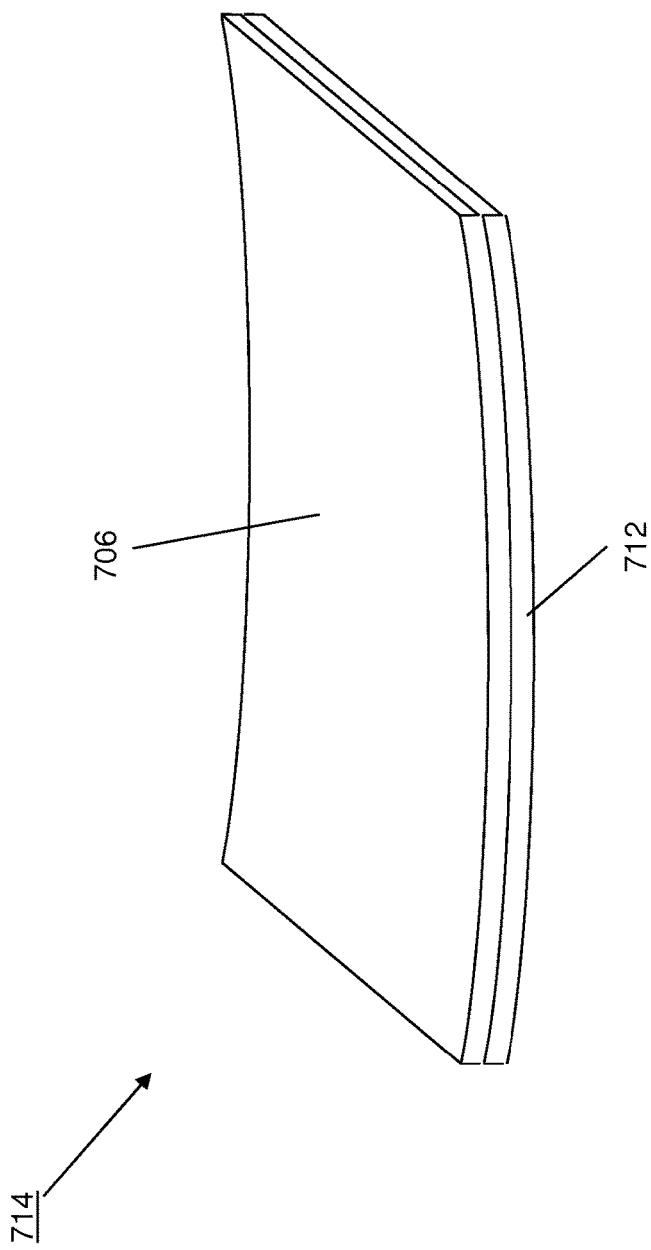
FIG. 7c is a perspective view illustrating an embodiment of the ceramic layer of FIG. 7a bonded to the first carbon fiber layer of FIG. 7b to provide a chassis wall.

The method 500 may then proceed to block 508 where the ceramic layer is bonded to the carbon fiber layer. Referring to FIGS. 7b and 7c, in an embodiment, the ceramic layer 706 provided at block 502 may be placed on the carbon fiber layer 712 provided at block 504 as illustrated in FIG. 7b. While the ceramic layer 706 is illustrated in FIG. 7b as being placed on the carbon fiber layer 712 while the carbon fiber layer 712 is in the mold 710 in which it was fabricated, in other embodiments, the carbon fiber layer 712 may be removed from the mold 710 and placed in another mold or processing subsystem in order to perform block 508. At block 508, a resin material such as, for example, the thermoset resin materials (e.g., epoxy resin materials), the thermoplastic resin materials (e.g., polycarbonate (PC), PC-Acrylonitrile Butadiene Styrene (ABS), etc.), and/or other resin materials known in the art may be applied to the carbon fiber layer 712, and then the ceramic layer 706 may be engaged with the carbon fiber layer 712, followed by processing such as curing in a compression mold. In some embodiments, in addition to the resin material, other materials such as adhesive materials (e.g., cyanoacrylate), adhesive promoting materials (e.g., primers), and/or other bonding materials known in the art may be utilized as well to bond the ceramic layer and the carbon fiber layer. The application of the resin material and/or other materials to the ceramic layer 706 and the carbon fiber layer 712 operates to bond the ceramic layer 706 to the carbon fiber layer 712 in order to provide a chassis wall 714 (or chassis wall portion 714 as discussed below with reference to block 510 and FIG. 7d), as illustrated in FIG. 7c. As discussed above, provisioning of the ceramic layer 706 in an as-sintered condition may provide a surface roughness of the ceramic layer that increases the bond strength between the ceramic layer 706 and the carbon fiber layer 712. As discussed above, the chassis wall 714 may exhibit a predefined shape that is provided strength from the carbon fiber layer 712 and that benefits from additional stiffness provided from the ceramic layer 706. In other embodiments, the carbon fiber layer(s) may be treated with the resin material, while the ceramic layer have an adhesive or adhesive promoting material applied, and then the two may be engaged and processed as discussed above. In relatively simple embodiments (e.g., planar walls), the carbon fiber layer may have the resin material applied and processed, and the processed carbon fiber layer may be adhered to the ceramic layer. While a few bonding methods have been discussed, a variety of other bonding methods are envisioned as falling within the scope of the present disclosure.

Figure 7D:
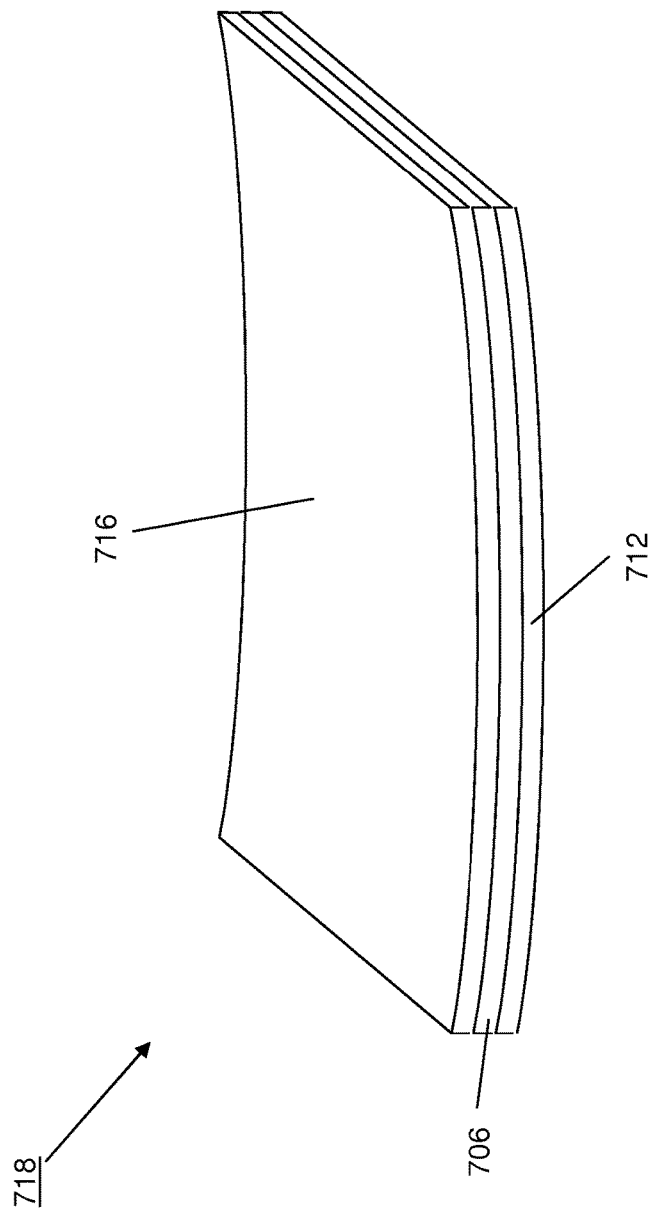
FIG. 7d is a perspective view illustrating an embodiment of the ceramic layer of FIG. 7a bonded to the first carbon fiber layer of FIG. 7b and a second carbon fiber layer to provide a chassis wall.

The method 500 may then proceed to optional block 510 where a second carbon fiber layer is bonded to the ceramic layer. As discussed above, in some embodiments, a second carbon fiber layer may be created at optional block 506, and at optional block 510 that second chassis wall may be bonded to the ceramic layer opposite the ceramic layer from the first carbon fiber layer in substantially the same manner as discussed above in block 508. For example, FIG. 7d illustrates a second carbon fiber layer 716 that has been bonded to the ceramic layer 706 opposite that ceramic layer 706 from the first carbon fiber layer 712 to provide a chassis wall 718. While the bonding of the second carbon fiber layer 716 to the ceramic layer 716 is illustrated and discussed as being performed separately from the bonding of the first carbon fiber layer 712 to the ceramic layer 706, one of skill in the art in possession of the present disclosure will recognize that the first carbon fiber layer 712 and the second carbon fiber layer 716 may be bonded to the ceramic layer 706 at the same time (or during the same process) while remaining within the scope of the present disclosure. Furthermore, additional ceramic layers and carbon fiber layers may be provided in the chassis wall 718 (e.g., a ceramic layer bonded to the carbon fiber layer 716, a carbon fiber layer bonded to that ceramic layer, and so on . . . ) As discussed above, the chassis wall 718 may exhibit a predefined shape that is provided strength from the carbon fiber layers 712 and 716, and that benefits from additional stiffness provided from the ceramic layer 706.

Figure 8:
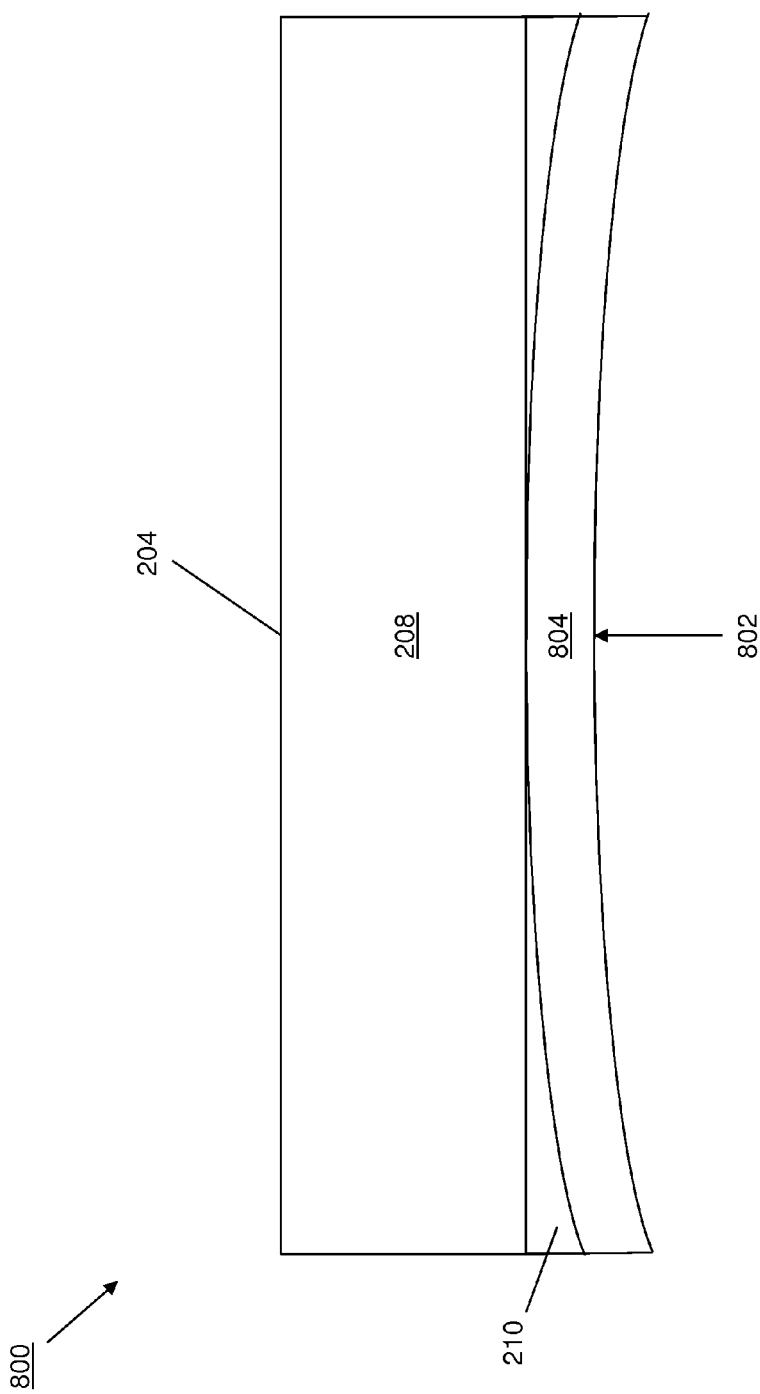
FIG. 8 is a cross-sectional view illustrating an embodiment of a conventional chassis wall experiencing a force.

Referring now to FIGS. 2c and 8, an embodiment of a conventional tablet computer 800 is illustrated experiencing a force 802. The conventional tablet computer 800 is substantially similar to the tablet computer 200 discussed above with reference to FIGS. 2a-2c, including the display device 208 providing the front surface 204 along with the housing portion 210, but with the provision of a conventional chassis wall 804 replacing the chassis wall 206 of the present disclosure. In the embodiment illustrated in FIG. 8, the conventional chassis wall 804 is provided with a thickness (e.g., between the outer surface provided by the conventional chassis wall 804 and the inner surface provided by the conventional chassis wall 804 that is immediately adjacent the housing portion 210) that is the same as the chassis wall 206 discussed below with reference to FIG. 9. As can be seen, the application of the force 802 produces a deflection of the conventional chassis wall 804 such that the conventional chassis wall 804 engages the display device 208. As is known in the art, engagement of the display device 208 in such a manner can damage the display device 208 and/or components of the display device 208. Furthermore, one of skill in the art in possession of the present disclosure will recognize that the deflection of the conventional chassis wall 804 produced by the force 802 may cause the conventional chassis wall 804 to engage other components in the conventional tablet computer 800 (e.g., a processor, a memory device, etc.) and cause subsequent damage as well. Further still, even if the deflection of the conventional chassis wall 804 produced by the force 802 does not cause the conventional chassis wall 804 to engage components in the conventional tablet computer 800, such deflections may create an undesirable feeling of weakness or lack of quality with regard to the conventional tablet computer 800 by a user.

Referring now to FIGS. 2c and 9, an embodiment of the tablet computer 200 is illustrated experiencing the force 802 discussed above with reference to FIG. 8. In the embodiment illustrated in FIG. 9, the chassis wall 206 is provided with the thickness (e.g., between the outer surface provided by the chassis wall 206 and the inner surface provided by the chassis wall 206 that is immediately adjacent the housing portion 210) that is the same as the conventional chassis wall 804 discussed above with reference to FIG. 8. As can be seen, the application of the force 802 produces a deflection of the chassis wall 206 that is less than the deflection produced in the conventional chassis wall 804, and results in the chassis wall 206 not engaging the display device 208 or other components in the tablet computer 200. Furthermore, the chassis wall 206 may be fabricated (e.g., according to the method 500 above) such that the force 802 (which may be the maximum force the chassis wall 802 is expected to experience during normal use) does not cause the chassis wall 206 to engage components in the tablet computer 200 or result in deflections may create an undesirable feeling of weakness or lack of quality with regard to the tablet computer 200 by a user (e.g., such that the force 802 produces a maximum deflection that is less than a critical deflection at which those events may occur).

Thus, systems and methods have been described that provide a chassis wall that may be fabricated thinner than conventional chassis walls while providing a stiffness that ensures that forces from typical uses of the chassis will not cause the chassis wall to deflect more than a maximum amount. The chassis walls of the present disclosure are realized by creating and bonding at least one ceramic layer to at least one carbon fiber layer in order to provide the chassis wall with the benefits of the strength of the carbon fiber layer and the added stiffness of the ceramic layer, which provides for a thin chassis wall with desirable stiffness and strength characteristics. As such, chassis may be provided that are thinner and lighter than conventional chassis while still exhibiting the same stiffness and strength characteristics that protect components in the chassis while providing a feeling of strength and quality for the system. In addition, embodiments of the chassis wall of the present disclosure allows for the use of a relatively thin layer of raw ceramic material (e.g., in its as-sintered condition), which reduces the costs of the chassis wall while still providing the stiffness discussed above.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system (IHS), comprising:
a chassis that defines a system housing;
a processing system that is located in the system housing, wherein the processing system is located in the system housing such that a first separation in the system housing is defined between the processing system and the composite chassis wall;
a display system that is located in the system housing and coupled to the processing system, wherein the display system is located in the system housing such that a second separation in the system housing is defined between the display system and the composite chassis wall; and
a composite chassis wall provided on the chassis, wherein the composite chassis wall includes:
a first carbon fiber layer that provides an outer surface of the chassis that is located opposite each other layer in the composite chassis wall from the housing; and
a ceramic layer that includes an unpolished, sintered surface that is bonded to the first carbon fiber layer using a resin material, and that is located opposite the first carbon fiber layer from the outer surface, wherein the ceramic layer provides increased stiffness to the composite chassis wall to resist a deflection of the composite chassis wall that occurs in response to a force and that is greater than the first separation or the second separation in order to prevent engagement of the component chassis wall and at least one of the display system and the processing system.

2. The IHS of claim 1, further comprising:
a second carbon fiber layer that is bonded to the ceramic layer and located opposite the ceramic layer from the first carbon fiber layer, wherein the second carbon fiber layer provides an inner surface of the composite chassis wall.

3. The IHS of claim 2, wherein the first carbon fiber layer, the ceramic layer, and the second carbon fiber layer are the only layers that make up the composite chassis wall.

4. The IHS of claim 1, wherein the ceramic layer includes a thickness ranging between 0.15 millimeters and 0.3 millimeters.

5. A system chassis, comprising:
a composite chassis wall including an inner surface and an outer surface;
a first carbon fiber layer that is included in the composite chassis wall and that provides the outer surface of the composite chassis wall;
a ceramic layer that is located opposite the first carbon fiber layer from the outer surface, wherein the ceramic layer includes an unpolished, sintered surface and provides increased stiffness to the composite chassis wall to resist deflection of the composite chassis wall that is more than a predetermined maximum amount in response to a predetermined force;
a resin material that is included in the composite chassis wall and that bonds the first carbon layer to the unpolished, sintered surface of the ceramic layer; and
a system component that is spaced apart from the composite chassis wall by a distance that is greater than the predetermined maximum amount of the deflection of the composite chassis wall.

6. The system chassis of claim 5, wherein the ceramic layer provides the inner surface of the composite chassis wall.

7. The system chassis of claim 5, further comprising:
a second carbon fiber layer that is bonded to the ceramic layer by the resin material and that is located opposite the ceramic layer from the first carbon fiber layer, wherein the second carbon fiber layer provides the inner surface of the composite chassis wall.

8. The system chassis of claim 7, wherein the first carbon fiber layer, the ceramic layer, and the second carbon fiber layer are the only layers that make up the composite chassis wall.

9. The system chassis of claim 5, wherein the ceramic layer includes a thickness ranging between 0.15 millimeters and 0.3 millimeters.

10. A method for providing an IHS chassis, comprising:
providing a ceramic layer that includes an unpolished, sintered surface for a composite chassis wall;
providing a first carbon fiber layer for the composite chassis wall;
bonding the unpolished, sintered surface of the ceramic layer to the first carbon fiber layer using a resin material to provide the composite chassis wall, wherein the first carbon fiber layer provides an outer surface for the composite chassis wall, and the ceramic layer is located opposite the first carbon fiber layer from the outer surface and provides increased stiffness to the composite chassis wall to resist deflection of the composite chassis wall more than a predetermined maximum amount in response to a predetermined force; and
providing a system component that is spaced apart from the composite chassis wall by a distance that is greater than the predetermined maximum amount of the deflection of the composite chassis wall.

11. The method of claim 10, wherein the ceramic layer includes at least one of alumina and boron carbide.

12. The method of claim 10, wherein the ceramic layer includes a thickness ranging between 0.15 millimeters and 0.3 millimeters.

13. The method of claim 10, further comprising:
providing a second carbon fiber layer for the composite chassis wall;
bonding the second carbon fiber layer to the ceramic layer to provide the composite chassis wall, wherein the second carbon fiber layer is located opposite the ceramic layer from the first carbon fiber layer and provides an inner surface of the composite chassis wall, and wherein the first carbon fiber layer, the ceramic layer, and the second carbon fiber layer are the only layers that make up the composite chassis wall.

14. The method of claim 10, wherein the first carbon fiber layer and the ceramic layer are created using at least one mold that provides a predetermined shape of the first carbon fiber layer and the ceramic layer such that the composite chassis wall includes the predetermined shape.

* * * * *